Oct. 14, 1952     D. R. STILLABOWER     2,613,979
PIEPAN LIFTING AND HANDLING IMPLEMENT
Filed April 27, 1950

Donald R. Stillabower
INVENTOR.

BY Clarence A. O'Brien
and Harvey B. Jackson
Attorneys

Patented Oct. 14, 1952

2,613,979

UNITED STATES PATENT OFFICE 2,613,979

PIEPAN LIFTING AND HANDLING IMPLEMENT

Donald R. Stillabower, Detour, Mich.

Application April 27, 1950, Serial No. 158,459

2 Claims. (Cl. 294—34)

The present invention relates to lifters for pie pans, plates, casseroles and the like and has more particular reference to a simple handling tool or implement which is conveniently usable to assist one in conveniently and satisfactorily picking up and removing pans from hot ovens.

It is a matter of common knowledge that special purpose lifting and carrying implements are not broadly new. As a matter of fact, persons skilled in the art to which the invention relates are aware that many and varied styles and forms of lifters have been devised and many are in daily use in home kitchens and elsewhere.

The types of lifters commonly found in this line of endeavor employ jaw-like grips which are adjustably connected together at corresponding ends and provided with suitable handle means. For the most part, the grips are so constructed that they frictionally embrace or grasp the rim portion of the plate or pan. Often the gripping action is such that it results in breaking or otherwise damaging the pie.

The object of the present invention is to structurally, functionally and otherwise improve upon known types of lifters. To this end, I provide a simple and practical implement in which manufacturers and users will more aptly find their expected needs and requirements fully met, contained and available.

In carrying out the principles of the instant invention, I provide substantially duplicate, suitably curved reach arms or jaws which straddle the rim of the pan and these are provided with flat plate members at corresponding inward ends, said plate members being superimposed upon each other, slidably keyed together and adjustably connected, all in such a manner as to provide what is believed to be a novelly constructed hot pan lifting and handling implement.

Another object of the invention is to provide an implement which is constructed, as stated, wherein the reach arms do not clamp around the rim of the plate or other utensil but simply provide seating and supporting ledges for the customary outstanding annular flange on the rim of the plate or pan. Also, by reason of the construction utilized it is possible to initially adjust and set the implement to the size of the pan before the latter is placed in the oven, after which said implement may be set aside in readiness for use when lifting and taking the hot pan from the oven.

In carrying out the invention, the two units are adjustably keyed and bolted together in such a way that the reach arms are in substantially the same plane and are in approximate parallelism. As they are adjusted toward and from each other they remain in the same plane and parallelism. The outer ends of the arms have opposed anti-slipping lugs and when the arms embrace the rim of the pan the lugs prevent accidental slipping of the pan through the space existing between said lugs. Also, the inward ends of the arms, the portions adjacent to the plate members, have their inner peripheral edge portion converging to provide a gradually narrowing crotch for more effectively seating and managing the hot pan as it is lifted from the oven and carried to the table or the like and deposited.

Other objects and advantages will become more readily apparent from the following description and the accompanying illustrative drawings.

In the accompanying sheet of drawings, wherein like numerals are employed to designate like parts throughout the same:

Figure 1:
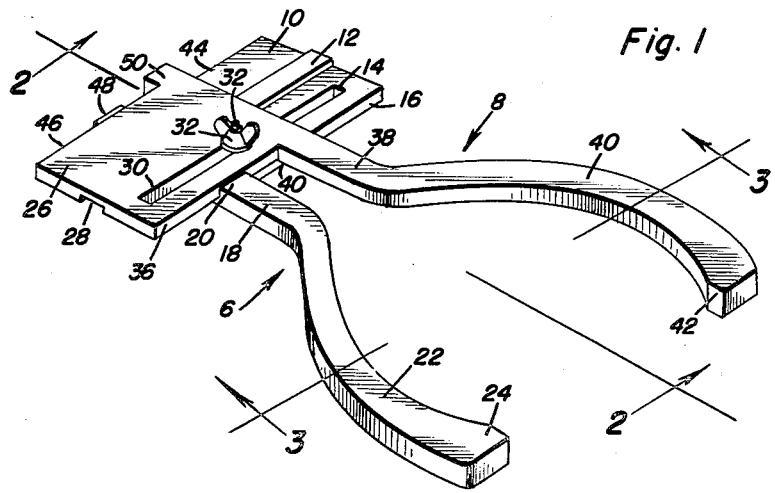
Fig. 1 is a perspective view of a pie pan lifting and removing implement constructed in accordance with the principles of the present invention.
Figure 2:
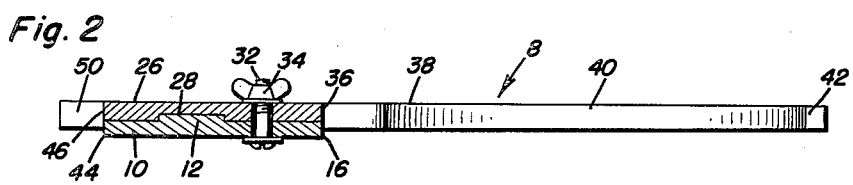
Fig. 2 is a longitudinal section taken on the central line 2—2 of Fig. 1, looking in the direction of the arrow.

Referring now to the drawing by reference numerals and accompanying lead lines, the invention comprises a pair of substantially duplicate complemental units 6 and 8, respectively. These may be of any appropriate, substantially rigid lightweight material. The unit 6 comprises a substantially rectangular plate 10 having a tongue or rib 12 centrally arranged and constituting a keying element and having parallel thereto an elongated slot 14. Extending at right angles from an edge portion 16 of the plate is a straight shank portion 18 having a shoulder 20 and gradually merging into a suitably curved reach arm or jaw 22 terminating in an inturned lateral lug 24. Unit 8 is substantially the same in construction and likewise comprises a flat rectangular plate 26 having a groove 28 forming a keyway for the keying element 12 and having a slot 30 registerable with slot 14. These two slots are registered and serve to accommodate an assembling and clamping bolt 32 provided with a wing nut 34. The edge 36 of plate 26 has a straight shank 38 parallel to the shank 18 and provided with a bracing and guiding shoulder 40. The shank 38 also merges into a curvate reach arm or jaw 40 which terminates in an inwardly directed lug 42. If desired, the rear edge portions 44 and 46 may be provided with lugs 48 and 50.

The plates 10 and 26 not only serve to assemble and join the units 6 and 8 but also provide handle means, as is obvious.

The jaw portions 22 and 40 are preferably rectangular in cross-section and suitably broad to provide substantial ledges to support the lip or annular flange A on the rim B of the pie pan or equivalent plate C.

Figure 3:
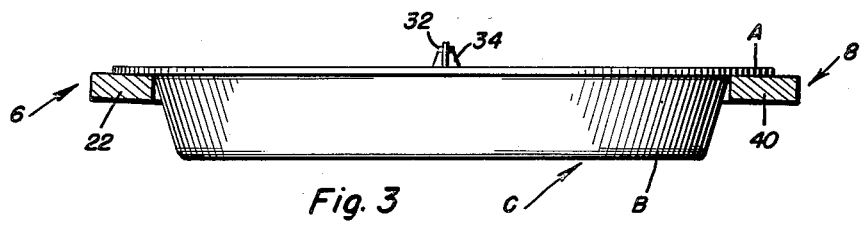
Fig. 3 is an enlarged cross-section on the line 3—3 of Fig. 1, looking in the direction of the arrows, and showing the manner in which the pan is supported on the implement.
Figure 4:
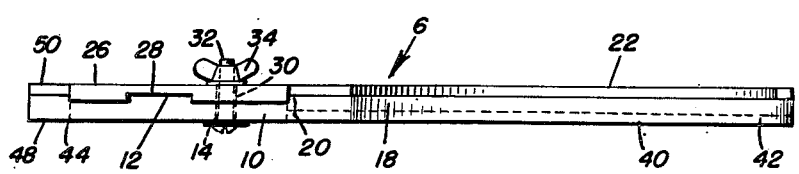
Fig. 4 is an edge elevation of the implement.

In using the device it is obvious that the space between the adjacent surfaces of the two lugs 24 and 42 is carefully regulated or set to just clear the small diameter of the conical rim of the pan. The arms are then placed on a level with the extreme bottom of the pan and are forced in with relation to the pan to embrace said rim. Then the implement is bodily lifted up so that the flat top surfaces of the arms are disposed beneath the flange A, as shown in Figure 3. The aforementioned gradually narrowing crotch insures that when the pan is fully between the arms 22 and 40, said arms function effectively to provide the stated lifting and supporting ledges.

In practice, the plate, casserole or pan is turned upside down and the units 6 and 8 are then set and adjusted so that they will fit nicely in association with the flange A. The arms do not clampingly bind and grip the rim but merely embrace the rim and provide supporting ledges for the flange A as is obvious. Obviously, by adjusting the implement before the pan is filled and put in the oven for baking, the implement is then self-set for convenient and practical use.

The lugs 48 and 50 are not too essential but may be used to pry the plates apart should they become stuck together. However, the terminal lugs 24 and 42 are quite essential in that they cooperate in keeping the pie pan from slipping or falling forwardly out of the lifter.

It is to be noted that this device is handy and reliable to use and that the plate members serve not to assemble and adjustably join the units 6 and 8 but have the additional important function of conveniently usable handles or handgrips. Since the arms merely embrace the rim of the pan they do not, under any circumstances, crush or dent the pan. The over-all construction is well balanced and there is no likelihood, in using the device, that the cover of the pie will in any manner be touched or damaged.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A plate lifter of the class herein shown and described comprising a curvate reach arm having a flat plate member at its inward end, a second curvate reach arm corresponding in shape and size to said first-named arm and having a corresponding plate member at its inward end, said plate members being superimposed one on the other, one plate having a keying tongue and the other plate having a keyway forming groove, said tongue fitting slidably into said groove and coacting in slidably keying said plate members together, said plate members also having registering slots, and a bolt passing through said slots and provided with a clamping nut.

2. A pie pan lifting, carrying and handling implement comprising a unit embodying a substantially rectangular plate having a central longitudinal keying rib and provided with an elongated slot parallel to said rib, a shank formed integral with and extending from one longitudinal edge of said plate, said shank being linearly straight, a longitudinally curved reach arm joined at its inward end to said shank, said reach arm terminating at its outward end in a laterally directed lug, a second unit comprising a plate superimposed on said first named plate and having a groove constituting a keyway, said rib fitting slidably into said keyway, said second plate being provided with a slot parallel to said groove and in registerable alignment with the first named slot, a shank formed integral with an edge portion of said second named plate and extending at right angles therefrom and said shank being linearly straight and in opposed parallelism with respect to said first named shank, and a second longitudinally curved reach arm opposed to said first named reach arm and joined at its inner end to said shank and provided at its outer end with a laterally directed lug opposed to said first-named lug, and bolt and nut means mounted in said slots.

DONALD R. STILLABOWER.

REFERENCES CITED

The following references are of record in the file of this patent:

UNITED STATES PATENTS

| Number | Name | Date |
| --- | --- | --- |
| 652,257 | Folger | June 26, 1900 |
| 1,606,569 | Guess | Nov. 9, 1926 |
| 2,367,991 | Bailey | Jan. 23, 1945 |